(12) United States Patent
Innis et al.

(10) Patent No.: US 10,972,277 B2
(45) Date of Patent: Apr. 6, 2021

(54) CONFIDENTIAL VERIFICATION OF FPGA CODE

(71) Applicant: INTEL CORPORATION, Santa Clara, CA (US)

(72) Inventors: Eric Innis, Hillsboro, OR (US); Raghunandan Makaram, Northborough, MA (US); Ting Lu, Austin, TX (US)

(73) Assignee: INTEL CORPORATION, Santa Clara, CA (US)

(*) Notice: Subject to any disclaimer, the term of this patent is extended or adjusted under 35 U.S.C. 154(b) by 338 days.

(21) Appl. No.: 15/459,939

(22) Filed: Mar. 15, 2017

(65) Prior Publication Data
US 2018/0270068 A1 Sep. 20, 2018

(51) Int. Cl.
*H04L 29/06* (2006.01)
*H04L 9/32* (2006.01)
(Continued)

(52) U.S. Cl.
CPC ............ *H04L 9/3234* (2013.01); *G06F 21/57* (2013.01); *G06F 21/602* (2013.01); *G06F 21/6209* (2013.01); *G06F 21/64* (2013.01); *G06F 21/76* (2013.01); *H04L 9/0631* (2013.01); *H04L 9/0637* (2013.01); *H04L 9/0838* (2013.01); *H04L 9/0841* (2013.01); *H04L 9/0894* (2013.01); *H04L 9/14* (2013.01); *H04L 9/3247* (2013.01); *H04L 63/0428* (2013.01);
(Continued)

(58) Field of Classification Search
CPC ... H04L 9/3234; H04L 9/3247; H04L 9/0631; H04L 9/0841; H04L 63/04282; H04L 9/14; H04L 9/0637; G06F 21/6209; G06F 21/602; G06F 21/64
See application file for complete search history.

(56) References Cited

U.S. PATENT DOCUMENTS

| 2014/0136823 A1* | 5/2014 | Ragland | G06F 9/44505 |
| | | | 713/1 |
| 2015/0229619 A1* | 8/2015 | Costa | H04L 63/0823 |
| | | | 713/171 |
| 2017/0103209 A1* | 4/2017 | Wooten | G06F 9/4406 |

FOREIGN PATENT DOCUMENTS

EP 3242232 * 3/2016 ............. G06F 17/50

OTHER PUBLICATIONS

Seshadri et al., "Pioneer: Verifying Code Integrity and Enforcing Untampered Code Execution on Legacy Systems" SOSP'05, Oct. 23-26, 2005, Brighton, United Kingdom. Copyright 2005 ACM 1595930795/ 05/0010, p. 1-16 (Year: 2005).*

\* cited by examiner

*Primary Examiner* — Harunur Rashid
(74) *Attorney, Agent, or Firm* — Hanley, Flight & Zimmerman, LLC

(57) ABSTRACT

The present disclosure provides confidential verification for FPGA code. Confidential verification for FPGA code can include receiving the policy from a cloud service provider (CSP) computing device, wherein the policy comprises a plurality of policy requirements used to determine whether to configure the FPGA using the code, receiving the code and the code encryption key from the user computing device, determining whether the code fulfills the plurality of policy requirements, and when the code fulfills the plurality of policy requirements encrypting and integrity protect the (Continued)

code using the code encryption key and providing the encrypted and integrity protected code to an accelerator loader to configure the FPGA using the code.

29 Claims, 7 Drawing Sheets

(51) Int. Cl.
*H04L 29/08* (2006.01)
*H04L 9/08* (2006.01)
*G06F 21/76* (2013.01)
*H04W 4/60* (2018.01)
*G06F 21/57* (2013.01)
*G06F 21/60* (2013.01)
*G06F 21/62* (2013.01)
*G06F 21/64* (2013.01)
*H04L 9/06* (2006.01)
*H04L 9/14* (2006.01)

(52) U.S. Cl.
CPC .......... *H04L 63/105* (2013.01); *H04L 63/123* (2013.01); *H04L 63/1458* (2013.01); *H04L 67/10* (2013.01); *H04W 4/60* (2018.02)

CONFIDENTIAL VERIFICATION OF FPGA CODE

TECHNICAL FIELD

The present disclosure relates to confidential verification of field programmable gate array (FPGA) code. In particular, the present disclosure relates to encrypting and integrity protecting FPGA code for configuring an FPGA.

DETAILED DESCRIPTION OF PREFERRED EMBODIMENTS

Figure 1:
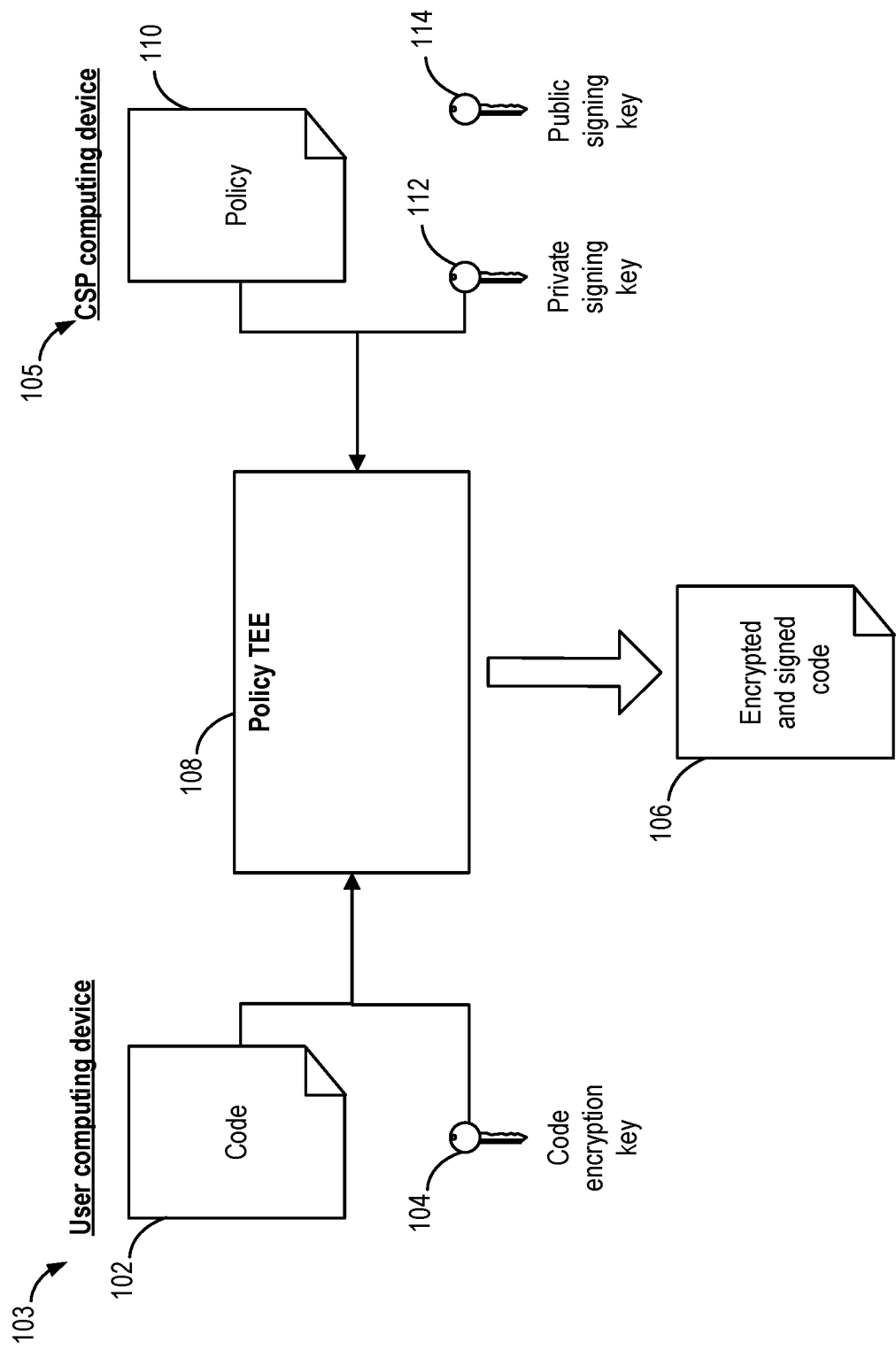
FIG. 1 is a block diagram illustrating the encrypting of FPGA code according to various embodiments.

Apparatuses, methods, and storage medium associated with confidential verification of accelerator code (e.g., code and/or FPGA code) are disclosed herein. In embodiments, an apparatus for computing may include one or more processors, with each processor having one or more processor cores, one or more wireless communication components, and memory coupled with the one or more processors. As used herein the accelerator code (e.g., code) can represent a hardware description language (HDL), a schematic, and/or a bitstream, among other types of data that can be used to configure an accelerator. As such, the terms bitstream and code can be used interchangeably.

As used herein, an accelerator can include an FPGA, a graphics accelerator, a graphics processing unit, and/or a machine learning accelerator, among other types of accelerators. The examples used in a number of embodiments described herein target an FPGA. However, it is to be understood that an FPGA is an example and as such can be embodiments can be implemented using any type of accelerator. As such, an FPGA loader can also be referenced as an accelerator loader.

A cloud service provider (CSP) may offer FPGA cloud services. A user may elect to utilize proprietary code to program an FPGA that is part of the CSP rather than utilize code provided by the CSP. In some examples, a user can be a customer of the CSP. However, the CSP may have reservations about utilizing code provided by a user to program the FPGA, at least in part, due to the vulnerability of permanent denial of service (pDOS) by malicious code. For example, a user may provide code that when used to configure an FPGA may cause the FPGA to exceed a maximum power and thereby harm the FPGA and/or a computing device hosting the FPGA.

Currently, FPGA implementations do not provide isolation between code provided by different users. Two cloud users using the same FPGA can interfere with and steal secrets from each other's code. A user's code may contain intellectual property (IP) that the user does not wish to share with the CSP. For example, trade secret algorithms and implementations, machine learning data sets, analytics, and/or cryptography, among others, may be provided in code used to configure FPGA. As such, a user may elect to not utilize a CSP's FPGA cloud services in order to not share the intellectual property inscribed in the code. In a number of embodiments, the above impediments to utilizing a user's code to program an FPGA that is part of a CSP can be overcome.

FPGA-based accelerators have been used in diverse applications such as machine learning, packet processing, and/or cryptography, among others. At the same time, there is increased interest to make these functions available on the cloud. There is great value for CSP to offer FPGA as a service. Offering FPGA cloud services provides users an opportunity to access performance benefits of acceleration as well as simplicity, flexibility, and/or total cost of ownership (TCO) benefits of the cloud.

As described above, there are several challenges with such an offering: a buggy or malicious FPGA program (e.g., FPGA code) can permanently damage (e.g., pDOS) the hardware. In order for CSPs to offer FPGA services, the CSPs need to verify that the user's code will not lead to pDOS; as the FPGA sizes grow bigger, it is possible to host multiple accelerators on the same FPGA hardware device, and it is possible that these accelerator slots are used by different users. In such multi-tenant situations, CSPs need to ensure that one user's code does not interfere with another user's code. A user's code will likely contain vital IP that the user would not want to share with the CSP. The user may desire to ensure that the toolchain used to build the code has not been compromised, for example, with embedded malware or vulnerabilities in the code.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternative embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed to imply that these operations are necessarily order dependent. In particular, these operations may not be performed in the order of presentation. Operations described may be performed in an order different from that of the described embodiment. Various additional operations may be performed and/or described. Operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram illustrating the encrypting of FPGA code according to various embodiments. FIG. 1 includes a user computing device 103 and a CSP computing device 105. The user computing device 103 can store code 102 and a code encryption key 104. The CSP computing device 105 can store a policy 110, a private signing key 112, and a public signing key 114. In some embodiments, the policy trusted execution environment (TEE) can be part of the user computing device, the CSP computing device, and/or a third-party computing device.

A policy TEE is a secure area of a computing device. The TEE can also refer to an enclave. The TEE can guarantee code and data that are loaded to the TEE to be protected with respect to confidentiality and integrity. In some examples, the TEE can be an isolated execution environment that provides security features such as isolated execution and integrity of trusted applications along with confidentiality of assets. The policy TEE can be implemented in one or more processing units and/or a memory controller, among other possible locations within a computing device. The policy TEE can also be referred to as a trusted toolchain. The polity TEE can also be implemented as a software guard extensions (SGX) enclave.

In some embodiments, the user's code 102 can be loaded to an FPGA without exposing the code to the CSP computing device 105 and/or the CSP in general. As used herein, the user computing device 103 can also refer to the user while the CSP computing device 105 can refer to the CSP, generally. Although a single user computing device 103 and a single CSP computing device 105 are shown, the user computing device 103 and/or the CSP computing device 105 can represent one or more computing devices. For example, the CSP computing device 105 can represent a first computing device to store the policy 110, a second computing device to store the private signing key 112, and/or a third computing device to store the public signing key 114.

In some embodiments, a policy TEE 108 can verify that the code 102 adheres to the policy 110 without exposing the code 102 to the CSP computing device 105. The policy TEE 108 can produce a signed copy of the code using the private signing key 112 provided by the CSP computing device 105.

The policy TEE 108 can be launched. For example, a processing unit of the computing device hosting the policy TEE 108 can launch the policy TEE 108. The CSP computing device 105 can perform an attestation procedure with the policy TEE 108 to ensure that the policy TEE 108 will enforce a policy. Performing attestation can include validating the integrity of a computing device. In some examples, an attestation procedure can include an SGX attestation. As such, the CSP computing device 105 can perform attestation with the user computing device 103 if the user computing device 103 is hosting the policy TEE 108 and/or a third-party CSP computing device 105 if the third-party CSP computing device 105 is hosting the policy TEE 108.

Performing attestation can include establishing a secure connection with a computing device hosting the policy TEE 108. For example, a secure connection can be established between the CSP computing device 105 and the user computing device 103 if the user computing device 103 hosts the policy TEE 108. A secure connection can also be established between the CSP computing device 105 and a third-party user computing device 103 if the third-party user computing device 103 hosts the policy TEE 108.

Using the secure connection established during attestation, the CSP computing device 105 can deliver the policy 110 and the private signing key 112 to the policy TEE 108. The secure connection between the CSP computing device 105 and the policy TEE 108 can be created using a sigma protocol and/or a Diffie-Hellman protocol, or any similar approach, for example. After a shared communication key has been established for the secure connection, the communications are secured by encrypting and authenticating all messages, for example using an advanced encryption standard in galois/counter mode (AES-GCM).

The user computing device 103 can also perform attestation with the policy TEE 108 to ensure that the policy TEE 108 will not release the code and/or the code encryption key 104. Using the secure connection established during attestation, the user computing device 103 can deliver the code 102 and code encryption key 104 to the policy TEE 108. In some examples, the policy TEE 108 can be part of a tool chain that the user computing device 103 uses to develop the code 102. In such an example, the code 102 and code encryption key 104 are implicitly provided to the policy TEE 108.

The policy TEE 108 can evaluate the code 102 to determine whether the code 102 fulfills the policy 110. If the code 102 meets the policy requirements provided by the policy 110, then the policy TEE 108 can encrypt and integrity protect the code 102 using the code encryption key 104. The encrypted and integrity protected code 102 can then be signed using the private signing key 112 to generate an encrypted and signed code 106. In some examples, encryption and integrity protection can be accomplished using an authenticated encryption scheme such as the AES-GCM, for example. The signature can be generated (e.g., accomplished) using a public key signature algorithm, for example, such as an elliptic curve digital signature algorithm (ECDSA) or an Ron Rivest, Adi Shamir, and Leonard Adleman (RSA) algorithm, among other public key signature algorithms. If the code 102 does not meet the policy requirements (e.g., policy 110), then the policy TEE 108 can provide an error message to the user computing device 103 and/or the CSP computing device 105. The error message can include details about the policy infringement.

The policy 110 defined by the CSP computing device 105 can include: which slot, in examples where multiple accelerator slots are supported on the same FPGA hardware, the code 102 is targeted at; an amount of FPGA resources (e.g., lookup tables (LUTs), digital signal processings (DSPs), static random-access memory (SRAM), among others) the code 102 is allowed to use; the physical bounding box, such as specifics of LUTs that can be used and/or where the wires can go, the code 102 is allowed to utilize; an amount of power the code 102 can consume; and timing requirements associated with the code 102; and which LUTs are available for use by the code 102.

In some examples, the policy can limit a memory region to which the code can be loaded and/or the input/output resources that the code can utilize. The policy can further limit the configuration and/or configuration patterns that can be used by code. For example, the policy can exclude code that incorporates virus patterns. The policy can limit the logical functions that can be implemented in a specific region of the accelerator. For example, the policy can utilize a truth table or other logical equivalents to determine what logical function can be implemented in specific regions of the accelerator. The policy can further limit the maximum switching frequency or clock frequency that can be set by the code. The policy can limit a maximum power consumption based on estimation, simulation, and/or test executions. The policy can limit how the code is formed and/or formatted. For example, the policy can limit a length of the code encryption key and/or a code encryption algorithm and mode used to encrypt the code.

Figure 2:
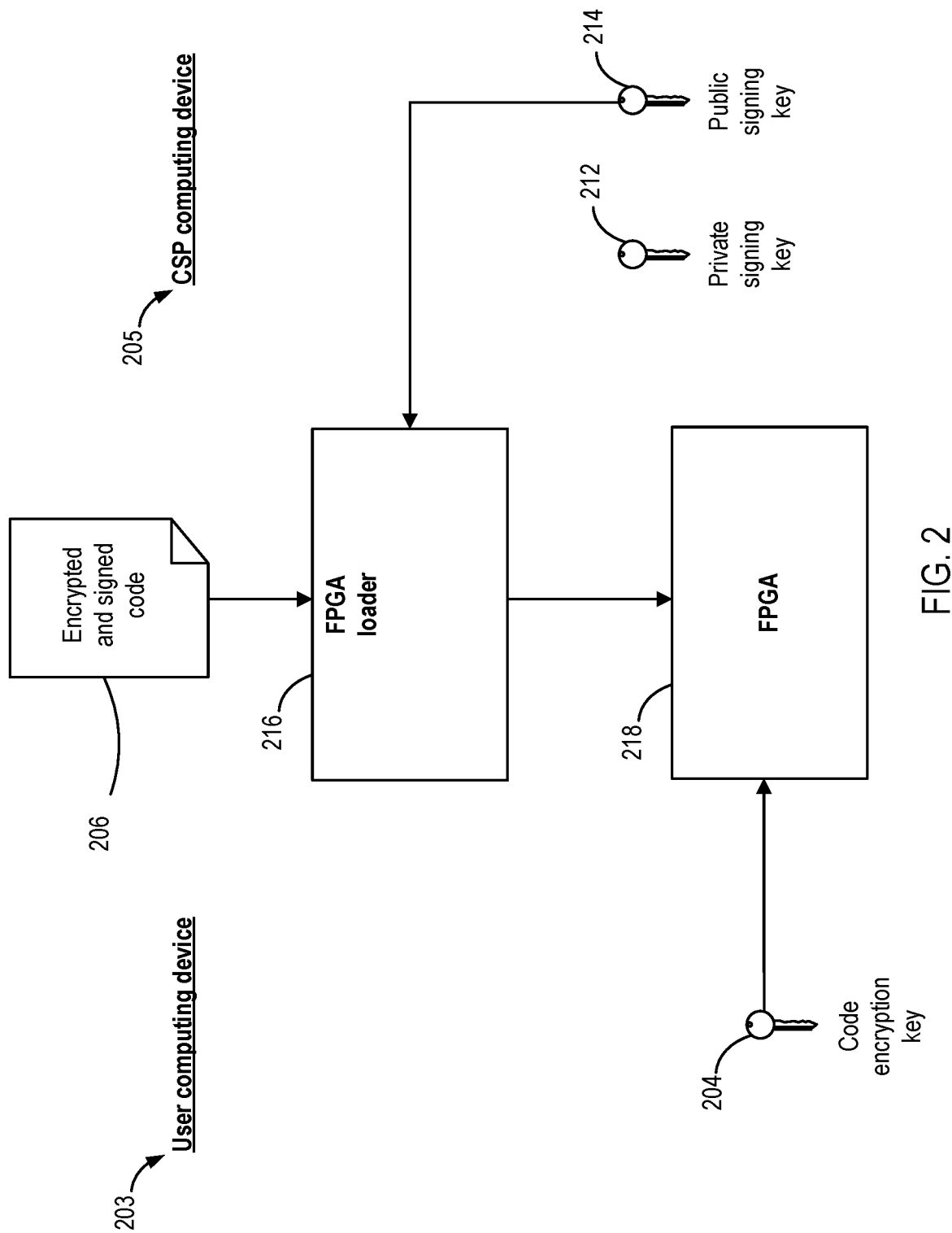
FIG. 2 is a block diagram illustrating the loading of the FPGA according to various embodiments.

FIG. 2 is a block diagram illustrating the loading of the FPGA according to various embodiments. FIG. 2 includes a user computing device 203 and a CSP computing device 205 analogous to the user computing device 103 and the CSP computing device 105 in FIG. 1. FIG. 2 also shows a code encryption key 204, an encrypted signed code 206, a private signing key 212, and a public signing key 214, that are analogous to the code encryption key 104, the encrypted signed code 106, the private signing key 112, and the public signing key 114 of FIG. 1, respectively.

The encrypted and signed code 206 can be stored in a number of computing devices. In some examples, the encrypted and signed code 206 can be stored in the user computing device 203, the CSP computing device 205, and/or a third-party computing device (not shown). In some examples, the policy TEE 108 of FIG. 1 and/or the user computing device 203 can provide the encrypted signed code 206 to an FPGA loader 216. The FPGA loader 216 can also be hosted (e.g., stored and/or executed) in the user computing device 203, the CSP computing device 205, and/or a third-party computing device. In some examples, the FPGA loader 216 can run in an SGX enclave, a virtual machine, and/or a virtual machine manager, among other executing systems.

The CSP computing device 205 can deliver the public signing key 214 of the signing key pair (e.g., private signing key 212 or the public signing key 214) to the signing FPGA loader 216. The FPGA loader 216 can verify the signature on the encrypted and signed code 206 utilizing the public signing key 214. If the signature of the encrypted and signed code 206 is valid, then the FPGA loader 216 can allow the encrypted and signed code 206 to be loaded into an FPGA 218 and/or can load the encrypted and signed code 206 into the FPGA 218. If the signature of the encrypted and signed code 206 is not valid, then the FPGA loader 216 will not allow the encrypted and signed code 206 to be loaded into the FPGA 218.

The FPGA 218 can receive the encrypted and signed code 206. That is, the FPGA 218 can be configured utilizing the encrypted and signed code 206. The user computing device 203 can provide the code encryption key 204 to the FPGA 218. The FPGA 218 and/or the FPGA loader 216 can utilize the code encryption key 204 to decrypt the encrypted and signed code 206. After decryption, the FPGA 218 can be configured using the decrypted code. The FPGA 218 can then perform a plurality of operations utilizing the decrypted code. By performing the above embodiments, the code can be verified confidentially. That is, it can be verified confidentially that encrypted and signed code 206 abides by a plurality of policies without exposing the encrypted and signed code 206 to the CSP computing device 205.

Figure 3:
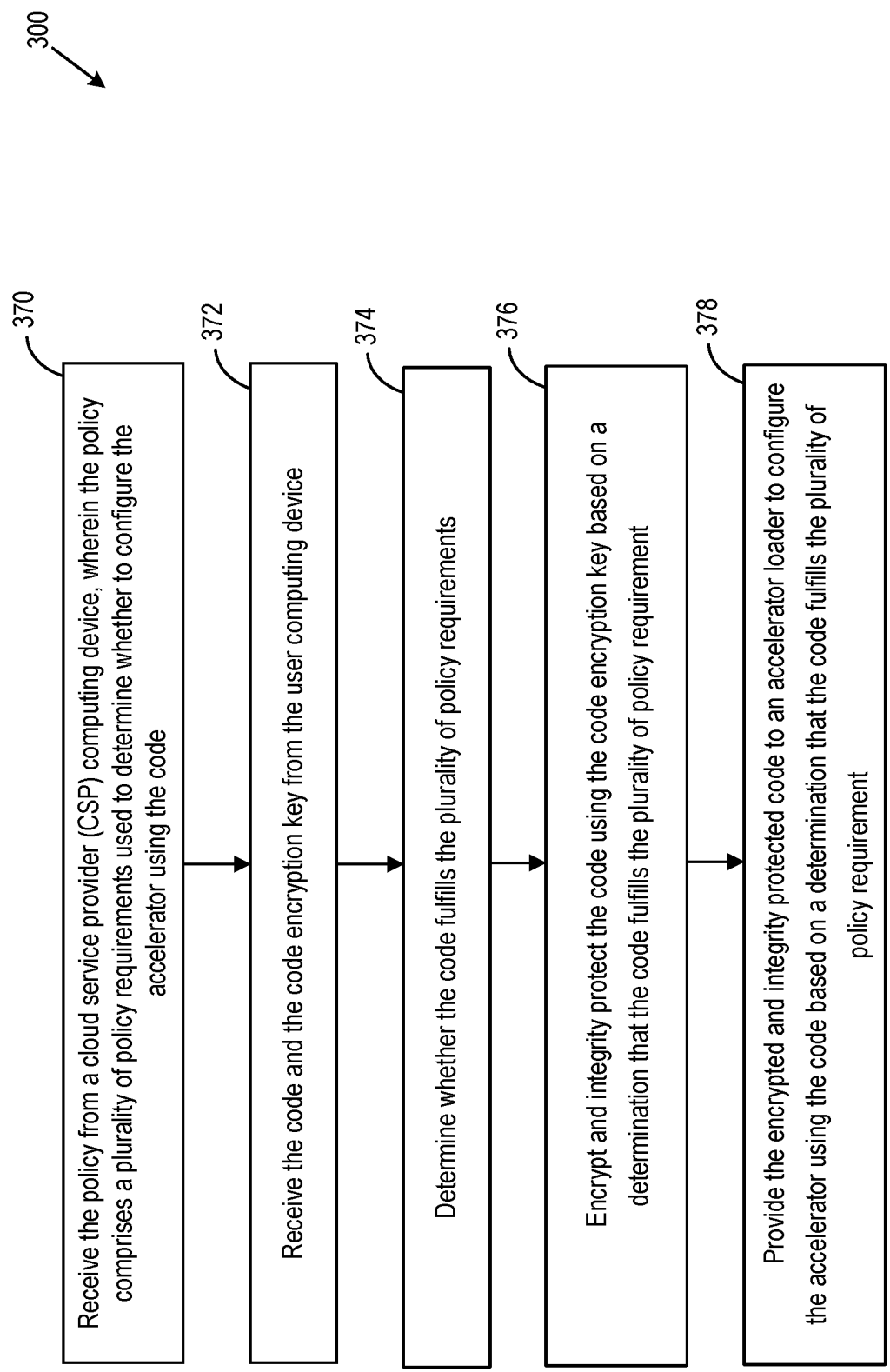
FIGS. 3, 4, and 5 are flow diagrams illustrating methods for confidential verification of FPGA code according to various embodiments.

FIG. 3 illustrates a method 300 for confidential verification of FPGA code according to various embodiments. The method 300 can include receiving 370 the CSP computing device, wherein the policy comprises a plurality of policy requirements used to determine whether to configure the accelerator using the code, receiving 372 the code and the code encryption key from the user computing device, determining 374 whether the code fulfills the plurality of policy requirements, encrypting 376 and integrity protect the code using the code encryption key based on a determination that the code fulfills the plurality of policy requirement, and providing 378 the encrypted and integrity protected code to an accelerator loader to configure the accelerator using the code based on a determination that the code fulfills the plurality of policy requirement.

The method 300 further comprises, if the code fulfills the plurality of policy requirements, signing the encrypted and integrity protected code using a private signing key provided by the CSP computing device. If the code does not fulfill the plurality of policy requirements, abstaining from signing the encrypted and integrity protected code.

The method 300 also comprises notifying the user computing device that the code does not fulfill the plurality of policy requirements, when the code does not fulfill the plurality of policy requirements. The apparatus can be part of the user computing device. The apparatus can also be part of the CSP computing device. The apparatus can further be part of a third-party computing device.

The method 300 can also include performing an attestation procedure with the CSP computing device to ensure enforcement of the policy if the code fulfills the plurality of policy requirements. Performing attestation can include establishing a secure connection with the CSP computing device. The policy and a private signing key can be received via the secure connection with the CSP computing device. A signing key can be generated by the policy TEE and a public portion of the signing key is provided to the CSP computing device.

Establishing the secure connection can further include establishing the secure connection using a sigma protocol or a Diffie-Hellman protocol. The method 300 can also include encrypting and authenticating messages transferred utilizing the secure connection. The encryption and authentication can be performed using an advanced encryption standard in galois/counter mode (AES-GCM).

The method 300 can also comprise performing an attestation procedure with the user computing device to ensure that the code and the code encryption key will not be released to the CSP computing device. In some examples, performing attestation further comprises establishing a secure connection with the user computing device. The code can be received via the secure connection with the user computing device. Establishing the secure connection can also include establishing the secure connection using a sigma protocol or a Diffie-Hellman protocol. The method 300 can also include encrypting and authenticating messages transferred utilizing the secure connection. The method 300 can also include receiving the code and the code encryption key are further configured to receive the code and the code encryption key from the user computing device.

The method 300 can further include signing the encrypted and integrity protected code are further configured to sign the encrypted and integrity protected code using at least one of an elliptic curve digital signature algorithm (ECDSA) and an Ron Rivest, Adi Shamir, and Leonard Adleman (RSA) algorithm. The policy can comprise at least one of a slot limitation that defines a set of resources on the FPGA to which the code has access, an amount of accelerator resources the code is allowed to use, a physical bounding box that can be utilized by the code, an amount of power that the code can consume, and a timing requirement associated with the code.

The timing requirements include limiting the code from creating at least one of timing loops and ring oscillators. The policy TEE can be an SGX enclave. The accelerator can be at least one of a FPGA, a graphics accelerator, a graphical processing unit, and a machine learning accelerator.

Figure 4:
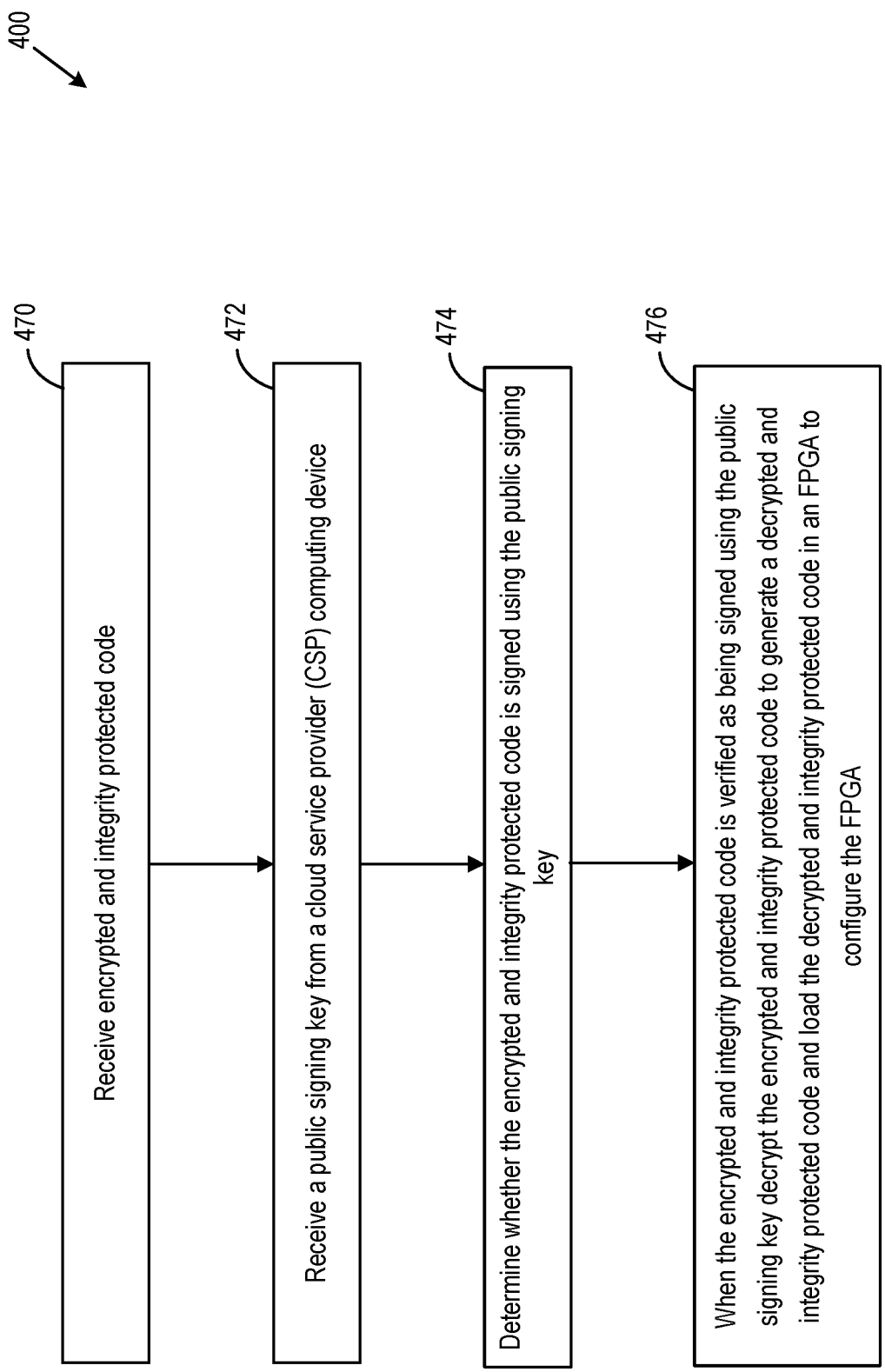

FIG. 4 illustrates a method for confidential verification of FPGA code according to various embodiments. The method 400 can include receiving 470 encrypted and integrity protected code, receiving 472 a public signing key from a CSP computing device, determining 474 whether the encrypted and integrity protected code is signed using the public signing key, and when the encrypted and integrity protected code is verified as being signed using the public signing key decrypting 476 the encrypted and integrity protected code to generate a decrypted and integrity protected code and loading the decrypted and integrity protected code in an FPGA to configure the FPGA.

The method 400 further comprises notifying at least one of the CSP computing device and a user computing device that the encrypted and integrity protected code was not signed using the public signing key when the encrypted and integrity protected code is not verified as being signed using the public signing key. The method 400 also comprises preventing the encrypted and integrity protected code from being decrypted and loaded in the FPGA if the encrypted and integrity protected code is not verified as being signed using the public signing key. The FPGA loader can be at least one of a computing device, a virtual computing device, or a virtual machine manager.

Figure 5:
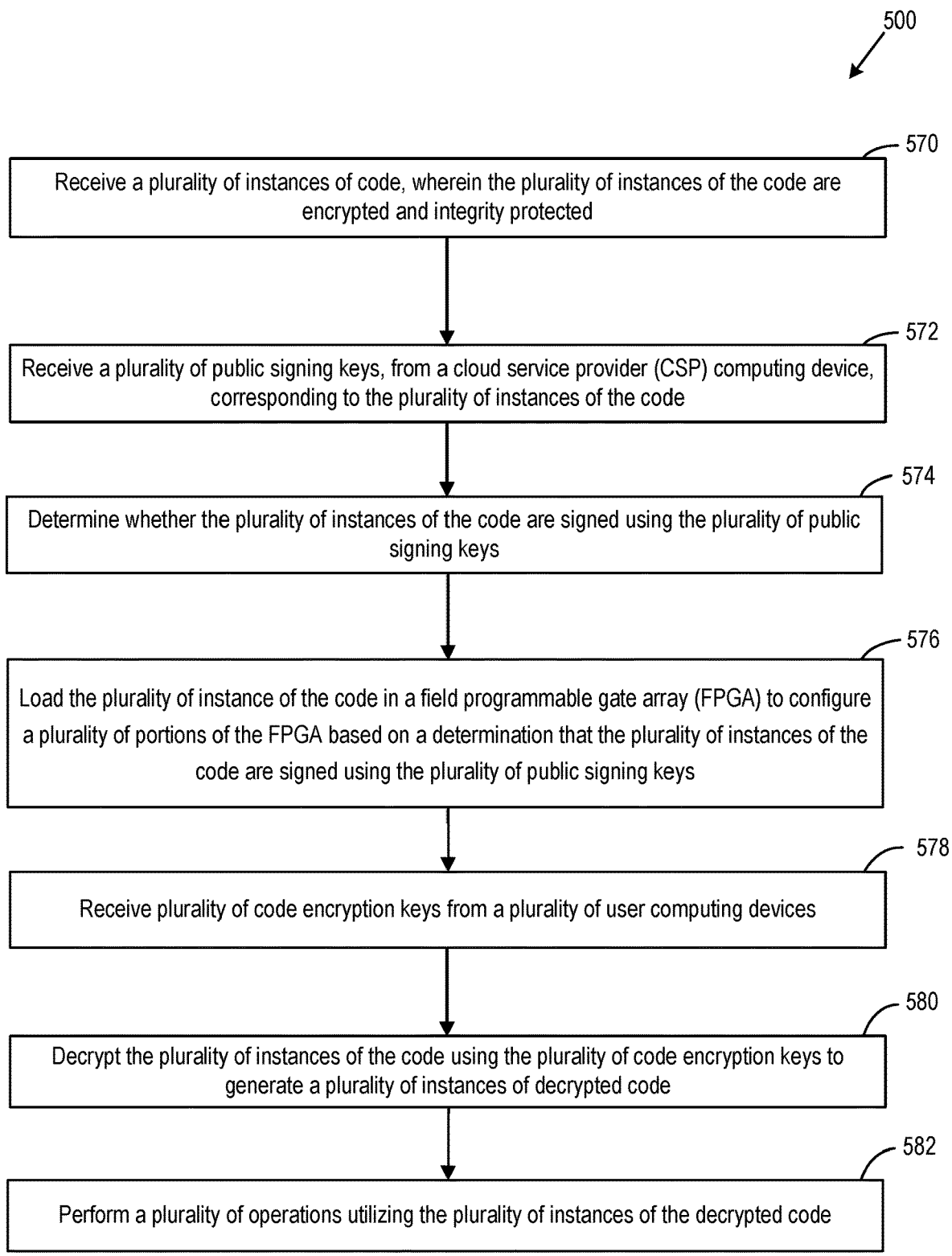

FIG. 5 illustrates a method for confidential verification of FPGA code according to various embodiments. The method 500 can include receiving 570 a plurality of instances of code, wherein the plurality of instances of the code are encrypted and integrity protected; receiving 572 a plurality of public signing keys, from a CSP computing device, corresponding to the plurality of instances of the code; determining 574 whether the plurality of instances of the code are signed using the plurality of public signing keys; loading 576 the plurality of instance of the code in a FPGA to configure a plurality of portions of the FPGA based on a determination that the plurality of instances of the code are signed using the plurality of public signing keys; receiving 578 plurality of code encryption keys from a plurality of user computing devices; decrypting 580 the plurality of instances of the code using the plurality of code encryption keys to generate a plurality of instances of decrypted code; and performing 582 a plurality of operations utilizing the plurality of instances of the decrypted code.

In some examples, the FPGA can be part of a cloud computing system. In some embodiments each of the plurality of instances of the code can correspond to a different one of the plurality of user computing devices.

In some examples, multiple different code instances (e.g., chunks of code) can be received from multiple sources. Each of the code instances can be validated as described above to determine whether each of the code instances conforms to the policies of the CSP (e.g., CSP computing device). Each of the code instances can be used to configure a different portion of the FPGA. For example, this may be useful when multiple customers are executing different instances of code on a same FPGA. That is, a first instance of the code from a plurality of instances of the code can configure a first portion of the FPGA from the plurality of portions of the FPGA and a second instance of the code from the plurality of instances of the code can configure a second portion of the FPGA from the plurality of portions of the FPGA.

Figure 6:
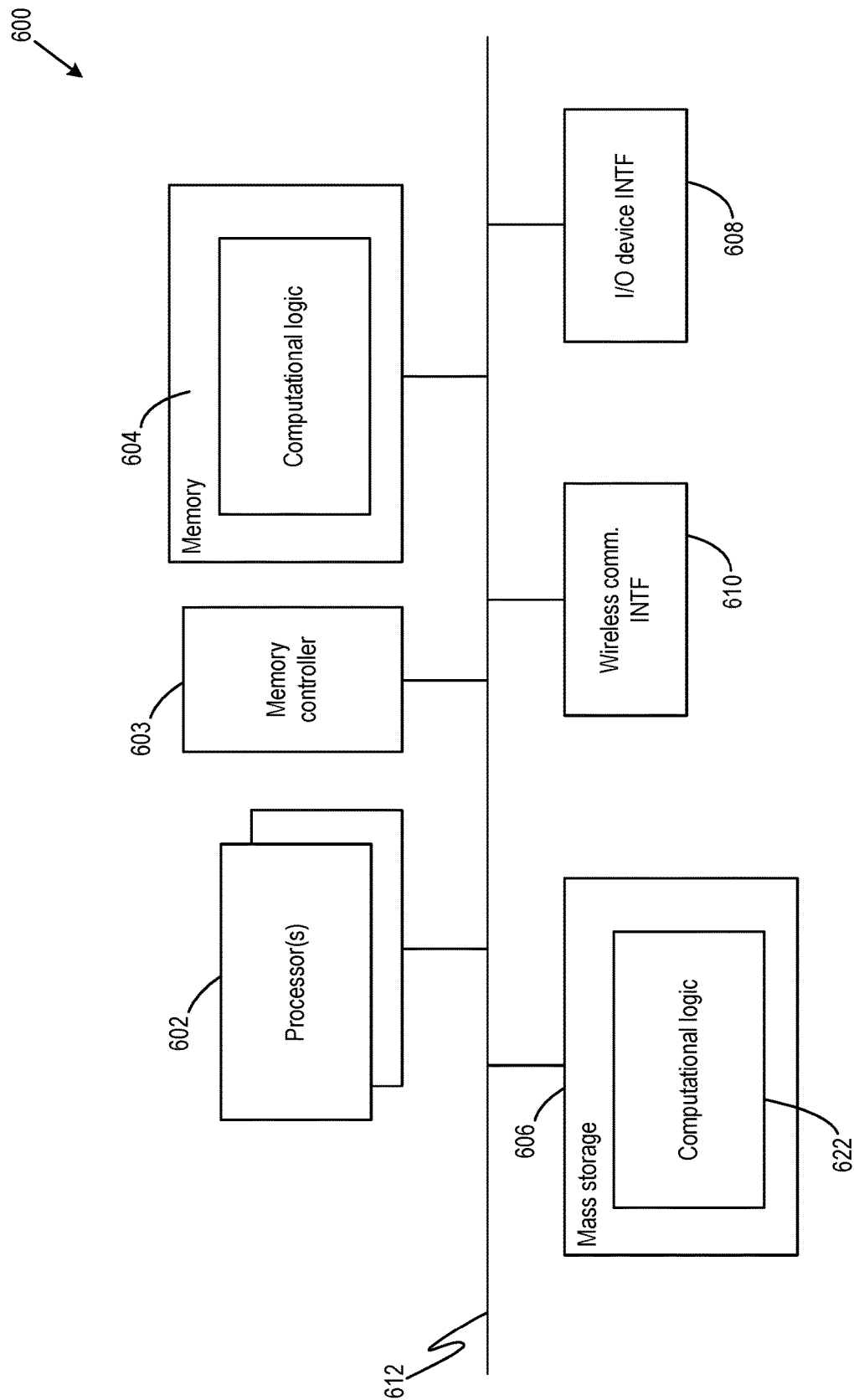
FIG. 6 is a block diagram illustrating an example computing device suitable for use to practice aspects of the present disclosure according to various embodiments.

FIG. 6 illustrates an example of a computing device 600 suitable for use to practice aspects of the present disclosure, according to various embodiments. As shown, the computing device 600 may include one or more processors 602, each with one or more processor cores and system memory 604. The system memory 604 may be any volatile or non-volatile memory. The memory controller 603 may be configured to control the system memory 604. Additionally, the computing device 600 may include mass storage devices 606. Examples of the mass storage devices 606 may include, but are not limited to, tape drives, hard drives, compact disc read-only memory (CD-ROM), and so forth. Further, the computing device 600 may include input/output devices 608 (such as display, keyboard, cursor control, and so forth) and communication interfaces 610 (such as wireless and/or wired communication/network interface cards, modems, and so forth). The elements may be coupled to each other via a system bus 612, which may represent one or more buses. In the case of multiple buses, they may be bridged by one or more bus bridges (not shown).

Each of these elements may perform its conventional functions known in the art. The system memory 604 and the mass storage devices 606 may be employed to store a working copy and a permanent copy of the programming instructions implementing the policy TEE 108, the FPGA loader 216, and/or the FPGA 218 of FIGS. 1 and 2, respectively, including performing confidential verification of FPGA code referred to as computational logic 622. The system memory 604 and the mass storage devices 606 can also be used to store the code 102, the code encryption key 104, the policy 110, the private signing key 112, and/or the public signing key 114 of FIG. 1 and the encrypted signed code 206 of FIG. 2. The computational logic 622 may be implemented by assembler instructions supported by the processor(s) 602 or high-level languages, such as, for example, C, that can be compiled into such instructions.

The number, capability, and/or capacity of elements 610 and 612 may vary, depending on whether the computing device 600 is used as a mobile device, such as a wearable device, a smartphone, a computer tablet, a laptop, and so forth, or a stationary device, such as a desktop computer, a server, a game console, a set-top box, an infotainment console, and so forth. Otherwise, the constitutions of elements 610 and 612 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system." Furthermore, the present disclosure may take the form of a computer program product embodied in any tangible or non-transitory medium of expression having computer-usable program code embodied in the medium.

Figure 7:
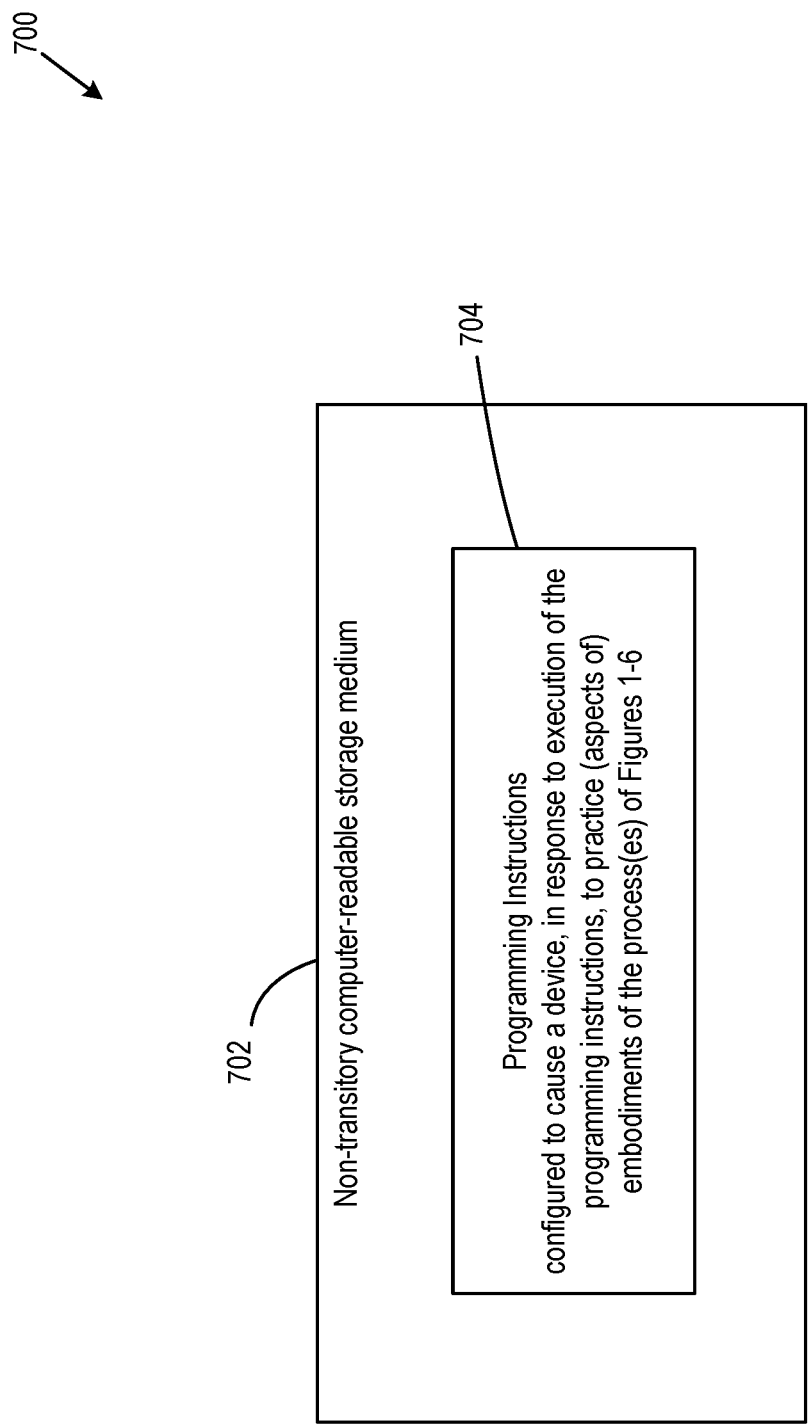
FIG. 7 is a block diagram illustrating a storage medium having instructions for practicing methods described with references to FIGS. 1-6 according to various embodiments.

FIG. 7 illustrates an example non-transitory computer-readable storage medium that may be suitable for use to store instructions that cause an apparatus, in response to execution of the instructions by the apparatus, to practice selected aspects of the present disclosure. As shown, a non-transitory computer-readable storage medium 702 may include a number of programming instructions 704. The programming instructions 704 may be configured to enable a device (e.g., the computing device 600 in FIG. 6) in response to execution of the programming instructions, to implement (aspects of) the policy TEE 108, the FPGA loader 216, and/or the FPGA 218 in FIGS. 1 and 2, as earlier described. In alternative embodiments, the programming instructions 704 may be disposed on the multiple non-transitory computer-readable storage media 702 instead. In still other embodiments, the programming instructions 704 may be disposed on the non-transitory computer-readable storage media 702, such as signals.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to, wireless, wireline, optical fiber cable, RF, etc.

Computer program code for carrying out operations of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an," and "the" are intended to include plural forms as well, unless the context clearly indicates otherwise. It will be further understood that the terms "comprises" and/or "comprising," when used in this specification, are specific to the presence of stated features, integers, steps, operations, elements, components, and/or groups, but do not preclude the presence or addition of one or more other features, integers, steps, operations, elements, components, and/or groups thereof.

Embodiments may be implemented as a computer process, a computing system, or an article of manufacture such as a computer program product of computer-readable media. The computer program product may be a computer storage medium readable by a computer system and encoding computer program instructions for executing a computer process.

The corresponding structures, material, acts, and equivalents of all means or steps plus function elements in the claims below are intended to include any structure, material, or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of the processors 602 may be packaged together with memory, as earlier described. For one embodiment, at least one of the processors 602 may be packaged together with memory, to form a System in Package (SiP). For one embodiment, at least one of the processors 602 may be integrated on the same die with memory. For one embodiment, at least one of the processors 602 may be packaged together with memory, to form a System on Chip (SoC). For at least one embodiment, the SoC may be utilized in, for example, but not limited to, a wearable device, a smartphone, or a computing tablet.

Thus, various example embodiments of the present disclosure have been described, including, but not limited to:

Example 1 is an apparatus for encrypting code for an accelerator. The apparatus includes one or more electronic memory to store the code received from a user computing device, a code encryption key, and a policy. The apparatus also includes a policy trusted execution environment (TEE) designed to receive the policy from a cloud service provider (CSP) computing device, where the policy includes a variety of policy requirements used to determine whether to design the accelerator using the code, and receive the code and the code encryption key from the user computing device. The apparatus also includes a policy trusted execution environment (TEE) designed to determine whether the code fulfills the variety of policy requirements, encrypt and integrity protect the code using the code encryption key based on a determination that the code fulfills the variety of policy requirement, and provide the encrypted and integrity protected code to an accelerator loader to design the accelerator using the code based on a determination that the code fulfills the variety of policy requirement.

Example 2 is the apparatus of Example 1, where the policy includes at least one of a slot limitation that defines a set of resources on the accelerator to which the code has access, an amount of accelerator resources the code is allowed to use, a physical bounding box that can be utilized by the code, an amount of power that the code can consume, and a timing requirement associated with the code.

Example 3 is the apparatus of Example 2, where the timing requirement limits the code from creating at least one of timing loops and ring oscillators.

Example 4 is the apparatus of Example 3, where the policy includes at least one of: lookup tables (LUTs) limitations, memory region limitations, and input/output limitations.

Example 5 is the apparatus of Example 4, where the policy includes at least one of: configuration patterns limitations, logical function limitations, maximum clock frequency limitations, and maximum power consumption limitations that are based on estimation, simulation, or test executions.

Example 6 is the apparatus of Example 1, where the one or more processing units are further designed to: if the code fulfills the variety of policy requirements, sign the encrypted and integrity protected code using a private signing key provided by the CSP computing device, and if the code does not fulfill the variety of policy requirements, abstain from signing the encrypted and integrity protected code.

Example 7 is the apparatus of Example 1, where the one or more processing units are further designed to, when the code does not fulfill the variety of policy requirements, notify the user computing device that the code does not fulfill the variety of policy requirements.

Example 8 is the apparatus of Example 1, where the one or more processing units are further designed to perform an attestation procedure with the CSP computing device to ensure enforcement of the policy if the code fulfills the variety of policy requirements.

Example 9 is the apparatus of Example 8, where the one or more processing units designed to perform attestation are also designed to establish a secure connection with the CSP computing device.

Example 10 is the apparatus of Example 9, where the policy and a private signing key are received via the secure connection with the CSP computing device.

Example 11 is the apparatus of Example 10, where a signing key is generated by the policy TEE and a public portion of the signing key is provided to the CSP computing device.

Example 12 is the apparatus of Example 9, where the one or more processing units designed to establish the secure connection are further designed to establish the secure connection using a sigma protocol or a Diffie-Hellman protocol.

Example 13 is the apparatus of Example 9, where the one or more processing units are further designed to encrypt and authenticate messages transferred utilizing the secure connection.

Example 14 is the apparatus of Example 13, where encryption and authentication are performed using an advanced encryption standard in galois/counter mode (AES-GCM).

Example 15 is the apparatus of Example 1, where the one or more processing units are further designed to perform an attestation procedure with the user computing device to ensure that the code and the code encryption key will not be released to the CSP computing device.

Example 16 is the apparatus of Example 15, where the one or more processing units designed to perform attestation are also designed to establish a secure connection with the user computing device.

Example 17 is the apparatus of Example 16, where the code is received via the secure connection with the user computing device.

Example 18 is the apparatus of Example 15, where the one or more processing units designed to establish the secure connection are further designed to establish the secure connection using a sigma protocol or a Diffie-Hellman protocol.

Example 19 is the apparatus of Example 15, where the one or more processing units are further designed to encrypt and authenticate messages transferred utilizing the secure connection.

Example 20 is the apparatus of Example 15, where the one or more processing units designed to receive the code and the code encryption key are further designed to receive the code and the code encryption key from the user computing device.

Example 21 is the apparatus of Example 1, where the policy TEE is an SGX enclave.

Example 22 is the apparatus of Example 1, where the accelerator is at least one of a field programmable gate array (FPGA), a graphics accelerator, a graphical processing unit, and a machine learning accelerator.

Example 23 is a computer-readable storage medium. The computer-readable storage medium, having stored thereon instructions that, when implemented by a field programmable gate array (FPGA) loader, cause the FPGA loader to: receive encrypted and integrity protected code, and receive a public signing key from a cloud service provider (CSP) computing device. The computer-readable storage medium, having stored thereon instructions that, when implemented by a field programmable gate array (FPGA) loader, cause the FPGA loader to determine whether the encrypted and integrity protected code is signed using the public signing key; and when the encrypted and integrity protected code is verified as being signed using the public signing key: decrypt the encrypted and integrity protected code to generate a decrypted and integrity protected code, and load the decrypted and integrity protected code in an FPGA to design the FPGA.

Example 24 is the computer-readable storage medium of Example 23, further includes instruction to, when the encrypted and integrity protected code is not verified as being signed using the public signing key, notify at least one of the CSP computing device and a user computing device that the encrypted and integrity protected code was not signed using the public signing key.

Example 25 is the computer-readable storage medium of Example 23, further includes instruction to, if the encrypted and integrity protected code is not verified as being signed using the public signing key, prevent the encrypted and integrity protected code from being decrypted and loaded in the FPGA.

Example 26 is the computer-readable storage medium of Example 23, where the FPGA loader is at least one of a computing device, a virtual computing device, or a virtual machine manager.

Example 27 is a method. The method includes receiving a variety of instances of code, where the variety of instances of the code are encrypted and integrity protected, receiving a variety of public signing keys, from a cloud service provider (CSP) computing device, corresponding to the variety of instances of the code, and determining whether the variety of instances of the code are signed using the variety of public signing keys. The method also includes loading the variety of instances of the code in a field programmable gate array (FPGA) to design a variety of portions of the FPGA based on a determination that the variety of instances of the code are signed using the variety of public signing keys, and receiving variety of code encryption keys from a variety of user computing devices. The method also includes decrypting the variety of instances of the code using the variety of code encryption keys to generate a variety of instances of decrypted code, and performing a variety of operations utilizing the variety of instances of the decrypted code.

Example 28 is the method of Example 27, where the FPGA is part of a cloud computing system.

Example 29 is the method of Example 28, where each of the variety of instances of the code correspond to a different one of the variety of user computing devices.

Example 30 is the method of Example 27, where a first instance of the code from the variety of instances of the code designs a first portion of the FPGA from the variety of portions of the FPGA and a second instance of the code from the variety of instances of the code designs a second portion of the FPGA from the variety of portions of the FPGA.

Example 31 is a method for encrypting code for an accelerator. The method includes receiving a policy from a cloud service provider (CSP) computing device, where the policy includes a variety of policy requirements used to determine whether to design an accelerator using code, receiving the code and an code encryption key from a user computing device, and determining whether the code fulfills the variety of policy requirements. The method also includes encrypting and integrity protecting the code using the code encryption key based on a determination that the code fulfills the variety of policy requirement, and providing the encrypted and integrity protected code to an accelerator loader to design the accelerator using the code based on a determination that the code fulfills the variety of policy requirement.

Example 32 is the method of Example 31, where the policy includes at least one of a slot limitation that defines a set of resources on the accelerator to which the code has access, an amount of accelerator resources the code is allowed to use, a physical bounding box that can be utilized by the code, an amount of power that the code can consume, and a timing requirement associated with the code.

Example 33 is the method of Example 32, where the timing requirement limits the code from creating at least one of timing loops and ring oscillators.

Example 34 is the method of Example 33, where the policy includes at least one of: lookup tables (LUTs) limitations, memory region limitations, and input/output limitations.

Example 35 is the method of Example 34, where the policy includes at least one of: configuration patterns limitations, logical function limitations, maximum clock frequency limitations, and maximum power consumption limitations that are based on estimation, simulation, or test executions.

Example 36 is the method of Example 31, further including if the code fulfills the variety of policy requirements, signing the encrypted and integrity protected code using a private signing key provided by the CSP computing device, and if the code does not fulfill the variety of policy requirements, abstaining from signing the encrypted and integrity protected code.

Example 37 is the method of Example 31, further including, when the code does not fulfill the variety of policy requirements, notifying the user computing device that the code does not fulfill the variety of policy requirements.

Example 38 is the method of Example 31, further including performing an attestation procedure with the CSP computing device to ensure enforcement of the policy if the code fulfills the variety of policy requirements.

Example 39 is the method of Example 38, where performing attestation also includes establishing a secure connection with the CSP computing device.

Example 40 is the method of Example 39, where the policy and a signing key are received via the secure connection with the CSP computing device.

Example 41 is the method of Example 40, where the signing key is generated by the policy TEE and a public portion of the signing key is provided to the CSP computing device.

Example 42 is the method of Example 39, where establishing the secure connection further includes establishing the secure connection using a sigma protocol or a Diffie-Hellman protocol.

Example 43 is the method of Example 39, further including encrypting and authenticating messages transferred utilizing the secure connection.

Example 44 is the method of Example 43, where encryption and authentication are performed using an advanced encryption standard in galois/counter mode (AES-GCM).

Example 45 is the method of Example 31, further comprising performing an attestation procedure with the user computing device to ensure that the code and the code encryption key will not be released to the CSP computing device.

Example 46 is the method of Example 45, where performing attestation further includes establishing a secure connection with the user computing device.

Example 47 is the method of Example 46, where the code is received via the secure connection with the user computing device.

Example 48 is the method of Example 45, where establishing the secure connection further includes establishing the secure connection using a sigma protocol or a Diffie-Hellman protocol.

Example 49 is the method of Example 45, further including encrypting and authenticating messages transferred utilizing the secure connection.

Example 50 is the method of Example 45, where receiving the code and the code encryption key further includes receiving the code and the code encryption key from the user computing device.

Example 51 is the method of Example 31, where the policy TEE is an SGX enclave.

Example 52 is the method of Example 31, where the accelerator is at least one of a field programmable gate array (FPGA), a graphics accelerator, a graphical processing unit, and a machine learning accelerator.

Example 53 is a method for encrypting code for an accelerator. The method includes receiving encrypted and integrity protected code, and receiving a public signing key from a cloud service provider (CSP) computing device. The method also includes determining whether the encrypted and integrity protected code is signed using the public signing key and when the encrypted and integrity protected code is verified as being signed using the public signing key: decrypting the encrypted and integrity protected code to generate a decrypted and integrity protected code, and loading the decrypted and integrity protected code in a field programmable gate array (FPGA) to design the FPGA.

Example 54 is the method of Example 53, further including, when the encrypted and integrity protected code is not verified as being signed using the public signing key, notifying at least one of the CSP computing device and a user computing device that the encrypted and integrity protected code was not signed using the public signing key.

Example 55 is the method of Example 53, further including, if the encrypted and integrity protected code is not verified as being signed using the public signing key, preventing the encrypted and integrity protected code from being decrypted and loaded in the FPGA.

Example 56 is the method of Example 53, where the FPGA loader is at least one of a computing device, a virtual computing device, or a virtual machine manager.

Example 57 is at least one computer-readable storage medium having stored thereon computer-readable instructions, when executed, to implement a method as exemplified in any of Examples 27-56.

Example 58 is an apparatus including a manner to perform a method as exemplified in any of Examples 27-56.

Example 59 is a manner for performing a method as exemplified in any of Examples 27-56.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for encrypting code for an accelerator, the apparatus comprising:
one or more electronic memory to store the code received from a user computing device, a code encryption key, and a policy; and
a policy trusted execution environment (TEE) configured to:
receive the policy from a cloud service provider (CSP) computing device, wherein the policy includes a plurality of policy requirements used to determine whether to configure the accelerator using the code, wherein the policy includes a timing requirement that includes limiting the code from creating at least one of timing loops or ring oscillators;
receive the code and the code encryption key from the user computing device;
determine whether the code fulfills the plurality of policy requirements;
encrypt and integrity protect the code using the code encryption key based on a determination that the code fulfills the plurality of policy requirements; and
provide the encrypted and integrity protected code to an accelerator loader to configure the accelerator using the code based on a determination that the code fulfills the plurality of policy requirement, the accelerator loader to (i) utilize a public key received from the CSP to determine if a signature of the encrypted and integrity protected code is valid, and (ii) decrypt and load the encrypted and integrity protected code in the accelerator if the signature is valid.

2. The apparatus of claim 1, wherein the policy includes at least one of a slot limitation that defines a set of resources on the accelerator to which the code has access, an amount of accelerator resources the code is allowed to use, a physical bounding box for the code to utilize, and an amount of power that the code is allowed consume.

3. The apparatus of claim 1, wherein the policy includes at least one of:
lookup tables (LUTs) limitations;
memory region limitations; and
input/output limitations.

4. The apparatus of claim 3, wherein the policy includes at least one of:
configuration patterns limitations;
logical function limitations;
maximum clock frequency limitations; and
maximum power consumption limitations that are based on one of estimation, simulation, and test executions.

5. The apparatus of claim 1, wherein the policy TEE is further to:
if the code fulfills the plurality of policy requirements, sign the encrypted and integrity protected code using a private signing key provided by the CSP computing device; and
if the code does not fulfill the plurality of policy requirements, abstain from signing the encrypted and integrity protected code.

6. The apparatus of claim 1, wherein the policy TEE is further to, when the code does not fulfill the plurality of policy requirements, notify the user computing device that the code does not fulfill the plurality of policy requirements.

7. The apparatus of claim 1, wherein the policy TEE is further to perform an attestation procedure with the CSP computing device to ensure enforcement of the policy based on the determination whether the code fulfills the plurality of policy requirements.

8. The apparatus of claim 7, wherein the policy TEE is further to establish a secure connection with the CSP computing device.

9. The apparatus of claim 8, wherein the policy and a private signing key are received via the secure connection with the CSP computing device.

10. The apparatus of claim 9, wherein a signing key is generated by the policy TEE and a public portion of the signing key is provided to the CSP computing device.

11. The apparatus of claim 8, wherein the policy TEE is further to establish the secure connection are further configured to establish the secure connection using a sigma protocol or a Diffie-Hellman protocol.

12. The apparatus of claim 8, wherein the policy TEE is further to encrypt and authenticate messages transferred utilizing the secure connection.

13. The apparatus of claim 12, wherein encryption and authentication are performed using an advanced encryption standard in galois/counter mode (AES-GCM).

14. The apparatus of claim 1, wherein the policy TEE is further to perform an attestation procedure with the user computing device to ensure that the code and the code encryption key will not be released to the CSP computing device.

15. The apparatus of claim 14, wherein the policy TEE is further to perform attestation are also configured to establish a secure connection with the user computing device.

16. The apparatus of claim 15, wherein the code is received via the secure connection with the user computing device.

17. The apparatus of claim 15, wherein the policy TEE is further to establish the secure connection using one of a sigma protocol and a Diffie-Hellman protocol.

18. The apparatus of claim 15, wherein the policy TEE is further to encrypt and authenticate messages transferred utilizing the secure connection.

19. The apparatus of claim 14, wherein the policy TEE is further to receive the code and the code encryption key from the user computing device.

20. The apparatus of claim 1, wherein the policy TEE is an SGX enclave.

21. The apparatus of claim 1, wherein the accelerator is at least one of a field programmable gate array (FPGA), a graphics accelerator, a graphical processing unit, and a machine learning accelerator.

22. A computer-readable storage medium comprising instructions that, when implemented by a field programmable gate array (FPGA) loader, cause the FPGA loader to at least:
store code received from a user computing device, a code encryption key, and a policy;
receive the policy from a cloud service provider (CSP) computing device, wherein the policy includes a plurality of policy requirements used to determine whether to configure an accelerator using the code, wherein the policy includes a timing requirement that includes limiting the code from creating at least one of timing loops or ring oscillators;
receive the code and the code encryption key from the user computing device;
determine whether the code fulfills the plurality of policy requirements;
encrypt and integrity protect the code using the code encryption key based on a determination that the code fulfills the plurality of policy requirements; and
provide the encrypted and integrity protected code to an accelerator loader to configure the accelerator using the code based on a determination that the code fulfills the plurality of policy requirement, the accelerator loader to (i) utilize a public key received from the CSP to determine if a signature of the encrypted and integrity protected code is valid, and (ii) decrypt and load the encrypted and integrity protected code in the accelerator if the signature is valid.

23. The computer-readable storage medium of claim 22, wherein the policy includes at least one of a slot limitation that defines a set of resources on the accelerator to which the code has access, an amount of accelerator resources the code is allowed to use, a physical bounding box for the code to utilize, and an amount of power that the code is allowed consume.

24. The computer-readable storage medium of claim 23, wherein the policy includes at least one of:
lookup tables (LUTs) limitations;
memory region limitations; and
input/output limitations.

25. The computer-readable storage medium of claim 24, wherein the policy includes at least one of:
configuration patterns limitations;
logical function limitations;
maximum clock frequency limitations; and
maximum power consumption limitations that are based on one of estimation, simulation, and test executions.

26. A method comprising:
storing code received from a user computing device, a code encryption key, and a policy;
receiving the policy from a cloud service provider (CSP) computing device, wherein the policy includes a plurality of policy requirements used to determine whether to configure an accelerator using the code, wherein the policy includes a timing requirement that includes limiting the code from creating at least one of timing loops or ring oscillators;
receiving the code and the code encryption key from the user computing device;
determining whether the code fulfills the plurality of policy requirements;
encrypting and integrity protect the code using the code encryption key based on a determination that the code fulfills the plurality of policy requirements; and
providing the encrypted and integrity protected code to an accelerator loader to configure the accelerator using the code based on a determination that the code fulfills the plurality of policy requirement, the accelerator loader to (i) utilize a public key received from the CSP to determine if a signature of the encrypted and integrity protected code is valid, and (ii) decrypt and load the encrypted and integrity protected code in the accelerator if the signature is valid.

27. The method of claim 26, wherein the policy includes at least one of a slot limitation that defines a set of resources on the accelerator to which the code has access, an amount of accelerator resources the code is allowed to use, a physical bounding box for the code to utilize, and an amount of power that the code is allowed consume.

28. The method of claim 27, wherein the policy includes at least one of:
  lookup tables (LUTs) limitations;
  memory region limitations; and
  input/output limitations.

29. The method of claim 28, wherein the policy includes at least one of:
  configuration patterns limitations;
  logical function limitations;
  maximum clock frequency limitations; and
  maximum power consumption limitations that are based on one of estimation, simulation, and test executions.

* * * * *